(12) United States Patent
Krishnaswamy et al.

(10) Patent No.: US 8,244,888 B2
(45) Date of Patent: Aug. 14, 2012

(54) METHOD AND MECHANISM FOR IMPLEMENTING TAGGED SESSION POOLS

(75) Inventors: Srinath Krishnaswamy, Fremont, CA (US); Debashis Saha, Foster City, CA (US); Sapna Chandiramani, Bangalore (IN); Amit Bande, Bangalore (IN); I. V. Krishna Mohan, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 13/158,341

(22) Filed: Jun. 10, 2011

(65) Prior Publication Data

US 2011/0307615 A1 Dec. 15, 2011

Related U.S. Application Data

(62) Division of application No. 10/428,152, filed on Apr. 30, 2003, now Pat. No. 7,962,630.

(60) Provisional application No. 60/379,663, filed on May 10, 2002.

(51) Int. Cl.
*G06F 15/16* (2006.01)
*G06F 15/173* (2006.01)
*G06F 9/46* (2006.01)

(52) U.S. Cl. ............ 709/228; 709/226; 718/104

(58) Field of Classification Search .......... 709/226–228, 709/223–224; 718/104
See application file for complete search history.

(56) References Cited

U.S. PATENT DOCUMENTS

| | | | |
|---|---|---|---|
| 5,355,406 A | 10/1994 | Chencinski et al. | |
| 5,826,253 A | 10/1998 | Bredenberg | |
| 6,098,093 A * | 8/2000 | Bayeh et al. | 709/203 |
| 6,105,067 A | 8/2000 | Batra | |
| 6,115,703 A | 9/2000 | Bireley et al. | |
| 6,230,200 B1 | 5/2001 | Forecast et al. | |
| 6,286,104 B1 | 9/2001 | Buhle et al. | |
| 6,321,235 B1 | 11/2001 | Bird | |
| 6,338,089 B1 * | 1/2002 | Quinlan | 709/227 |
| 6,338,117 B1 | 1/2002 | Challenger et al. | |
| 6,351,775 B1 | 2/2002 | Yu | |
| 6,366,945 B1 | 4/2002 | Fong et al. | |
| 6,397,253 B1 * | 5/2002 | Quinlan et al. | 709/227 |
| 6,477,569 B1 | 11/2002 | Sayan et al. | |
| 6,493,718 B1 | 12/2002 | Petculescu et al. | |
| 6,519,643 B1 * | 2/2003 | Foulkes et al. | 709/227 |
| 6,571,286 B2 | 5/2003 | Fisher et al. | |
| 6,651,142 B1 | 11/2003 | Gorelik et al. | |
| 6,901,446 B2 | 5/2005 | Chellis et al. | |

(Continued)

OTHER PUBLICATIONS

Non-Final Office Action dated Mar. 13, 2007 for U.S. Appl. No. 10/427,701.
Notice of Allowance dated Oct. 2, 2007 for U.S. Appl. No. 10/427,701.
Non-Final Office Action dated Jul. 25, 2007 for U.S. Appl. No. 10/428,152.

(Continued)

*Primary Examiner* — Peling Shaw
(74) *Attorney, Agent, or Firm* — Vista IP Law Group, LLP

(57) ABSTRACT

An improved method, mechanism, and system for implementing, generating, and maintaining for implementing session pools is disclosed. A session in a session pool can be customized to with a specific set of affinities and attributes. Tags can be associated with the customized sessions. When a later request is made for a session having a set of desired characteristics, the tags can be used to search for and identify a session in the session pool having the requested characteristics. Also disclosed is a method, mechanism, and system for dynamic sizing of session pools.

13 Claims, 14 Drawing Sheets

U.S. PATENT DOCUMENTS

| | | |
|---|---|---|
| 6,912,586 B1 | 6/2005 | Achtermann et al. |
| 6,996,614 B2 | 2/2006 | Hallinan et al. |
| 7,000,019 B2 * | 2/2006 | Low et al. .................... 709/227 |
| 7,003,574 B1 * | 2/2006 | Bahl .............................. 709/228 |
| 2002/0065915 A1 | 5/2002 | Anderson et al. |
| 2003/0065711 A1 * | 4/2003 | Acharya et al. ............... 709/203 |
| 2003/0093527 A1 | 5/2003 | Rolia |
| 2003/0120780 A1 | 6/2003 | Zhu et al. |
| 2003/0125034 A1 | 7/2003 | Weerakoon et al. |
| 2003/0236780 A1 | 12/2003 | Saha et al. |
| 2004/0006625 A1 | 1/2004 | Saha et al. |
| 2004/0006711 A1 | 1/2004 | Krishnaswamy et al. |
| 2004/0019680 A1 | 1/2004 | Chao et al. |

OTHER PUBLICATIONS

Non-Final Office Action dated Sep. 2, 2008 for U.S. Appl. No. 10/428,152.
Non-Final Office Action dated Aug. 3, 2010 for U.S. Appl. No. 10/428,152.
Final Office Action dated Mar. 28, 2008 for U.S. Appl. No. 10/428,152.
Final Office Action dated Feb. 27, 2009 for U.S. Appl. No. 10/428,152.
Notice of Allowance dated Feb. 3, 2011 for U.S. Appl. No. 10/428,152.

* cited by examiner

| Session ID | Tag | Custom Attributes |
|---|---|---|
| S1 | Chinese | Chinese Affinity |
| S2 | A | Extra memory resources |
| S3 | B | Performance limits set |
| S4 | B | Performance limits set |
| S5 | Not Assigned | None – default characteristics |
| ... | ... | ... |

Fig. 8

METHOD AND MECHANISM FOR IMPLEMENTING TAGGED SESSION POOLS

CROSS-REFERENCE TO RELATED APPLICATIONS

The present application constitutes a division of and thereby claims the benefit of U.S. application Ser. No. 10/428,152, now U.S. Pat. No. 7,962,630, filed on Apr. 30, 2003, entitled "METHOD AND MECHANISM FOR IMPLEMENTING TAGGED SESSION POOLS", the content of which is hereby expressly incorporated by reference in its entirety, and which claims the benefit of U.S. Provisional Application Ser. No. 60/379,663, entitled "Session Pooling and Statement Sharing", filed on May 10,2002, the contents of which are explicitly incorporated herein by reference in its entirety.

BACKGROUND AND SUMMARY

The invention relates to computer systems, and more particularly to a method and mechanism for implementing sessions in a computing system.

Computing systems, e.g., networked database management systems, often employ a multi-tier structure to manage and access data stored in the system. Referring to FIG. 1, an example three-tier structure is shown that includes a back-end resource server (e.g., database server 102) to manage and store access to data resources, a middle-tier server 104 (e.g., an application server or web server) and any number of client applications 106a-c (e.g., a web browser application).

In a common use for this type of architecture, a web browser at a client 106a will seek to access a particular web page. The web page may include or incorporate data from a back-end database 108 that is managed by database server 102. This type of request can be made, for example, as a specific URL or a HTML-based statement requesting data to be displayed on the web browser. The request is sent from client 106a to a middle tier server 104. The middle tier server 104 will have sufficient information about the location of the data to be able to route the request to the one or more specific database servers 102 that can fulfill the request and obtain the requested data from database 108. The requested data may be routed back through middle tier server 104, where it could be appropriately packaged for display on the web browser at client 106a. Alternatively, the data could be directly sent from database server 102 to client 106a.

To process the request at the application server 104, a "session" may be created and assigned to a specific client. The session is set of assigned resources that is used to perform work on behalf of a client. For example, the session may include assigned context or memory resources. In addition, access management may be performed in which the client is authenticated by the system before being assigned to a session that is given appropriate access to the database server 102. An example approach for managing access and performing authentication in an n-tier computing system is described in U.S. Pat. No. 6,286,104, which is hereby incorporated by reference in its entirety.

In one approach, a dedicated session is specifically allocated for a given client request or client, and the dedicated session only performs work on behalf of its assigned client. The session in this approach cannot be shared with other clients. Instead, each other client must specifically allocate and de-allocate its own dedicated session as needed. Typically, there is significant amount of overhead involved to perform the task of creating a new session and allocating the resources need by that session, particularly if the database is remote. Additional overhead is incurred to destroy the session after it is no longer needed. The expense of having to separately create a new session for each and every client application could be prohibitively expensive and could significantly affect the performance and efficiency of the overall system.

In an alternate approach, a pool of sessions is created that is shared among a number of different clients. Instead of specifically assigning a dedicated session for each client, each client may be assigned an available session from a pool of sessions. This approach may be more efficient than the approach of dedicating a session for each client, since the idle sessions can be reassigned to be used by other client, maximizing the efficient use of resources assigned to sessions. Moreover, this approach is more efficient since the costs involved in forming sessions can be performed once for each live session, and not incurred again for each additional client that uses the session.

The middle tier application can be responsible for managing session pooling for application users. In this approach, users authenticate themselves to the application, which uses a single identity to log into the database and maintains all the connections.

The present invention provides an improved method, mechanism, and article of manufacture for implementing session pools. In one embodiment, a session in a session pool can be customized to with a specific set of affinities and attributes. Tags can be associated with the customized sessions. When a later request is made for a session having a set of desired characteristics, the tags can be used to search for and identify a session in the session pool having the requested characteristics. An alternate embodiment of the invention is directed to dynamic sizing of session pools, in which the number of sessions in a given session pool or sub-session pool can be dynamically adjusted upwards or downwards.

Further details of aspects, objects, and advantages of the invention are described below in the detailed description, drawings, and claims.

BRIEF DESCRIPTION OF THE DRAWINGS

The accompanying drawings are included to provide a further understanding of the invention and, together with the Detailed Description, serve to explain the principles of the invention. The same or similar elements in the figures may be referenced using the same reference numbers.

FIG. 8 is a chart showing the attributes of the tagged session from FIG. 7.

DETAILED DESCRIPTION

The invention relates to computer systems, and more particularly to a method and mechanism for implementing sessions in a computing system.

Figure 1:
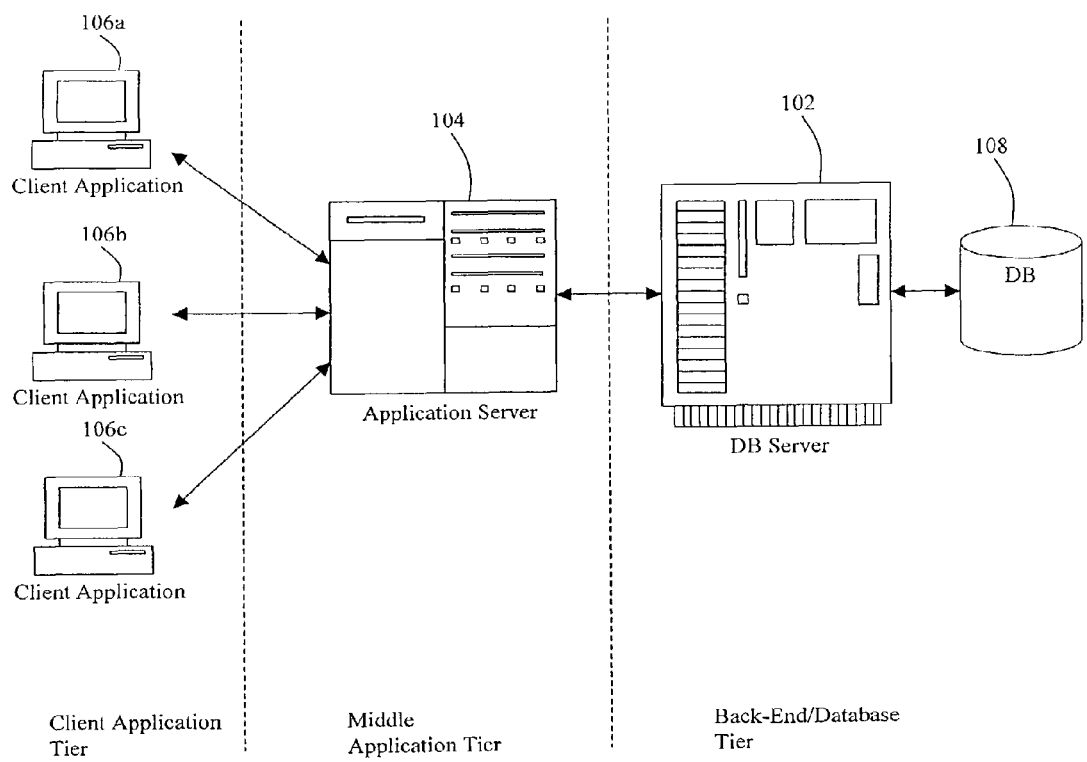
FIG. 1 shows an example n-tier computing architecture.
Figure 2:
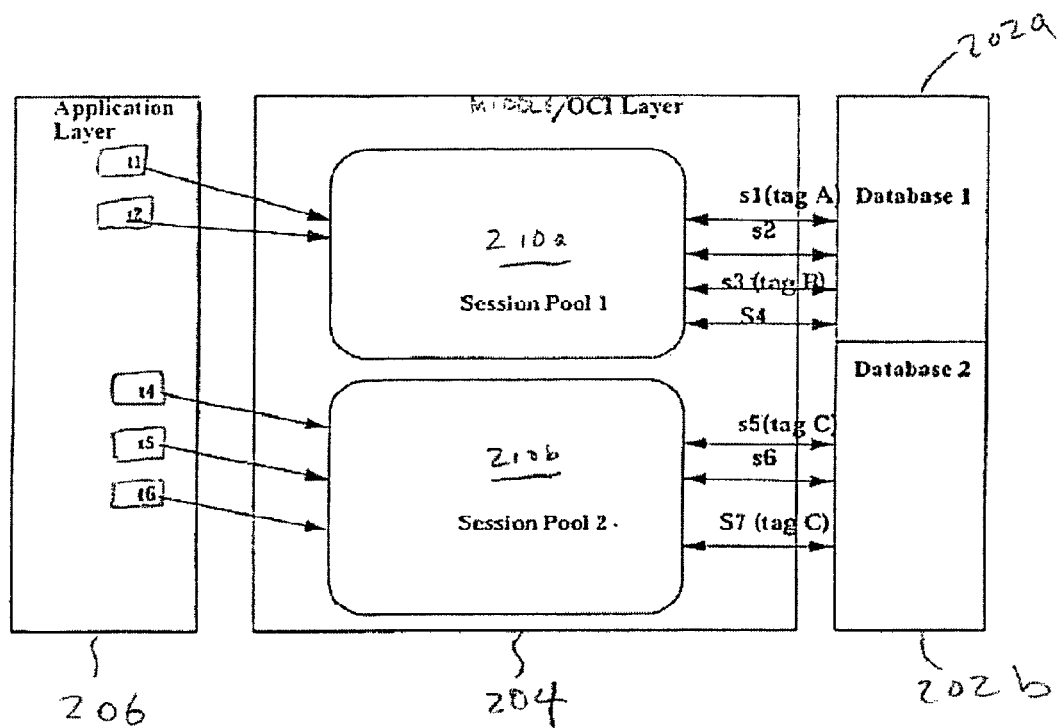
FIG. 2 shows an architecture for implementing session pools according to an embodiment of the invention.

FIG. 2 shows an architecture for implementing session pooling according to an embodiment of the invention. Client application layer 206 includes a number of client applications t1, t2, t4, t5, and t6. An example of a client application that could be appropriately placed in client application layer 206 is a web browser that accesses and displays web pages containing information from remote database systems. The client application sends requests to a middle tier server 204.

The middle tier server 204 includes one or more session pools 210*a* and 210*b*. While only two session pools are shown in FIG. 2, it can be appreciated that any number of session pools may be created at a middle tier server 204. Each session pool includes a group of one or more sessions that connect to a database server. In the present example, session pool 210*a* includes four sessions (s1, s2, s3, and s4) to access database 202*a*. Session pool 210*b* includes three sessions (s5, s6, and s7) to access database 202*b*. While FIG. 2 shows each session pool accessing a different database, it is noted that if desired, each session pool may access multiple databases, including a database accessed by another session pool.

When a client application sends a work request to the middle tier 204, an attempt is made to assign a free session from the appropriate session pool is assigned to that client. The session pool therefore multiplexes client access to sessions. The behavior of the client application when no free sessions are available and the pool has reached its maximum size, will depend on certain attributes. A new session may be created or an error returned, or the thread may just block and wait for a session to become free. As described in more detail below, the number of session in the different session pools can be dynamically adjusted to increase or decrease the relative number of sessions in the different session pools. When the client is done with the session, the client will release it to the session pool.

In one embodiment, each session pool services a different set of client applications or users. One reason to maintain separate session pools for different client applications and users is because the intended scope of access rights or access requirements may differ between different groups of users. For example, consider a typical business organization that is composed of multiple departments, such as a business that has both a marketing department and an accounting department. The user or application in the marketing department may be given full access rights to a database of customer contacts, but is given only limited access rights to financial information stored in an accounting database. However, the user or application in the accounting department may need full access rights to the accounting database and little or no access rights to the customer database. In this approach, the users or applications would be undergoing authentication to access a session in its designated session pool(s). The designated session pool can be configured to limit the scope of data access available to sessions in the pool, e.g., by restricting the specific databases accessed by those sessions along with the extent of that access. Once authentication has occurred, an available session from within the appropriate session pool would be assigned to the client application. Alternatively, there may be different levels of privileges based upon the rights of the different users that access the session pool; this means that different authentications may be required to maintain adequate security.

Some or all of the sessions in the session pools may be "stateless" sessions. As referred to herein, a stateless session does not maintain "transactional" state for database access between client applications. In database systems, a transaction normally refers to an atomic set of operations performed against a database. The transaction may access, create, modify, or delete database data or database metadata while it is being processed. A "commit" occurs when the transaction has completed its processing and any changes to the database by the transaction are ready to be "permanently" implemented in the database system. Because the transaction is atomic, all actions taken by the transaction must be committed at the same time. Therefore, by utilizing stateless sessions, the sessions can be shared between different client applications even though the different client applications operate within different transactions. These sessions will be handed over to thin clients as requested.

One benefit of this type of session pooling is performance. For example, making a connection to the database can be an expensive and time-consuming activity, especially when the database is remote. Instead of a client spending time connecting to the server, authenticating its credentials, and then receiving a valid session, it can just select an available session from the session pool.

Figure 3:
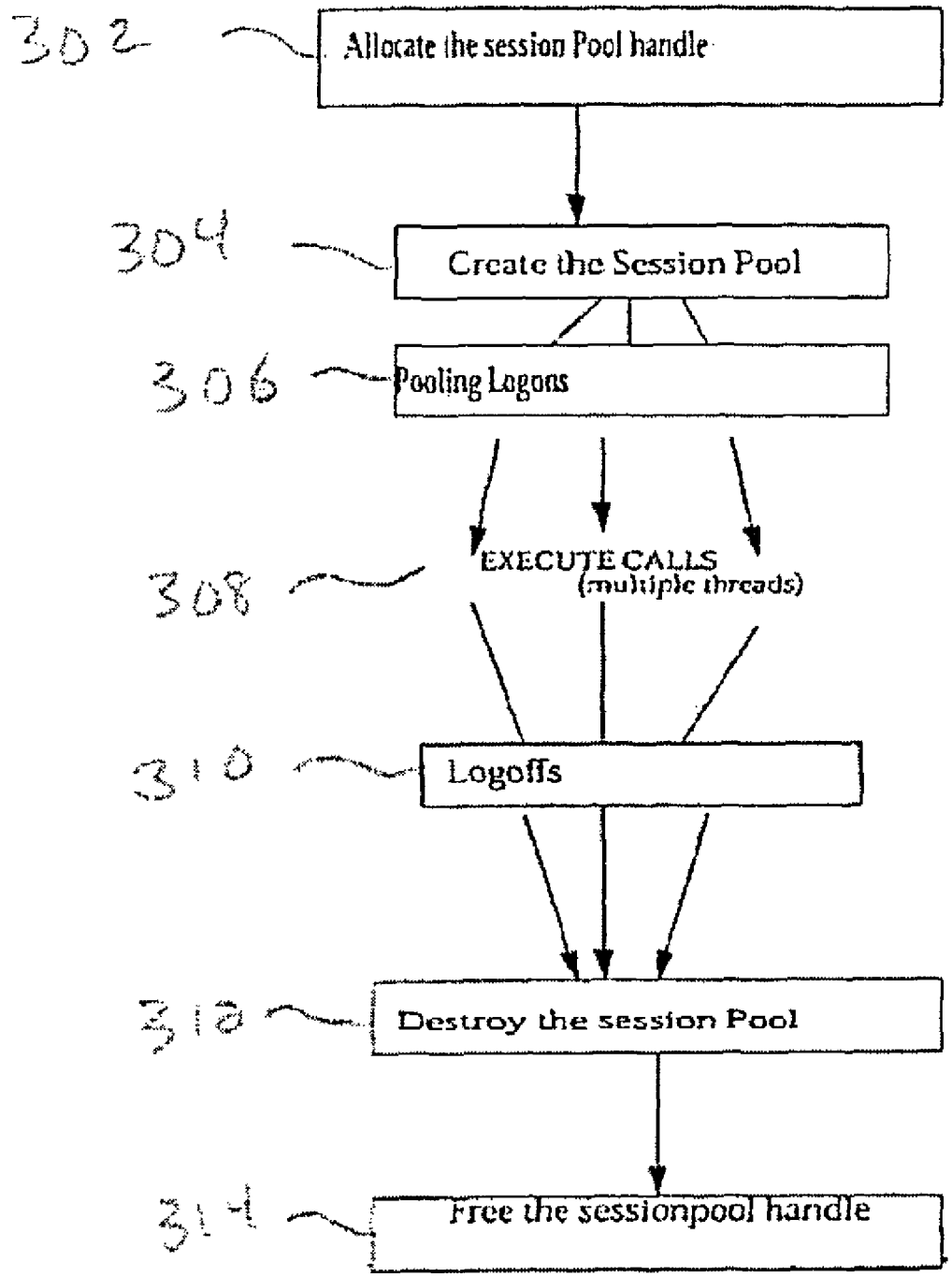
FIG. 3 shows a flowchart of a process for implementing session pools according to an embodiment of the invention.

FIG. 3 shows a flowchart of a process for implementing session pools according to an embodiment of the invention. Some or all of these actions may be implemented as API calls to a call interface that interacts with either/or the middle tier server 204 or the database server 202. For example, some or all of these actions may be implemented as OCI (Oracle Call Interface) calls when used in conjunction with the Oracle 9i database management system, available from Oracle Corporation of Redwood Shores, Calif.

Initially, a session pool "handle" is allocated for a new session pool (302). The handle is any label or identifier that can be used to uniquely identify the new session pool. A session pool is created which is associated with the new session pool handle (304). In one embodiment, dedicated resources may be allocated for the new sessions at both the middle tier server as well as the database server. Such resources include, for example, memory resources. The memory resources may be assigned from a shared global memory area at the server.

Various attributes can be specified for the new session pool. For example, a minimum number of sessions can be specified for the new session pool, which can also be the number of sessions that are initially started when the session pool is created. After this, sessions are created as necessary or according to the usage requirements of the system. In addition, a value can be specified that identifies the maximum number of sessions permitted for the session pool. Time-out attributes may be established for the session pool. For example, if a session is idle beyond an acceptable time period, then it can be terminated to maintain an optimum number of open sessions. A least recently used (LRU) algorithm may be applied to time out sessions when space in the session pool is required. Authentication information can also be specified for the session pool, including one or more user name/password combinations for users permitted to access sessions in the session pool. However, any suitable authentication mechanism may be used to authenticate users, e.g., Kerberos and SSL. Depending upon the specific application to which the invention is directed, some or all of the session attributes may be dynamically adjustable. It is noted that this is a short list of possible attributes that may be established for a session pool—other and additional attributes may be utilized as required by the specific application to which the invention is directed.

Connection pooling may be employed in conjunction with session pooling. Connection pooling allows sharing of a given network connection between the middle tier server and two or more client applications/users. In one embodiment, when connection pooling is employed, the session is assigned or created over a connection from the existing connection pool and returned. If no free connections are available, then a new connection may be created for the connection pool and assigned to the session/user.

Once a user/client has been authenticated and has "logged on" to the middle tier server, an attempt is made to assign a session to that user from the session pool (306). If a free session is available in the session pool, then the free session is assigned to the user. If a free session is not available, then a determination is made whether sufficient resources exist to create another session in the session pool. Assuming sufficient resources are available, then a new session is created and is assigned to the user. Even if sufficient resources are not available, dynamic sizing of the session pools may be performed to create a new session for the user, as explained in more detail below. Alternatively, blocking or waiting may be imposed until a session becomes available. If a maximum limit for the number of sessions for the session pool was specified, then a determination is also made whether creating a new session will cause the session pool to exceed the maximum number. In this approach, the new session will not be created if it will cause the number of sessions in the session pool to exceed the maximum number.

Once a session has been assigned, that session will perform work on behalf of that user (308). This work may include, for example, sending and receiving data requests and data responses to the database server. Multiple threads of execution may be utilized to allow multiple sessions to concurrently access the database.

When the user has completed its work, a logoff is performed (310). At this point, the session (and/or connection) assigned to that user can be released back into the session pool (and/or connection pool). If the session pool will exceed a desired number of active sessions, then the session can be de-allocated instead of being released to the session pool.

When the need for the session pool no longer exists, the session pool can be destroyed and its sessions/resources de-allocated (312). If a call is performed to destroy a session pool while one or more sessions are still active/busy, then in one embodiment, waiting is performed to allow the sessions complete their work before destroying the session pool. However, no sessions will be assigned to perform more work on behalf of users. Alternatively, an error can be returned there are active/busy sessions when the call is made to destroy the session pool. In one alternate approach, the system is configured to "force" the destruction of the session pool, even if there are one or more active/busy sessions. Once the session pool has been destroyed, the session pool handle can be freed (314).

Dynamic Sizing of Session Pools

Different sets of users may be assigned to different session pools. One reason for segregating users between different session pools is to establish "homogeneous" session pools, in which the sessions within the pool are alike with respect to authentication, e.g., having the same username and password and privileges. One advantage provided by a homogenous session pool is that many organizations have groups of users that all share the same requirements with respect to security levels and access privileges, e.g., the accountants in the accounting department of a company may all have common data access needs. Since the entire group has these common requirements, having session pool with shared authentication information and configured with the common data access requirements makes the process of system administration for the group more efficient and reliable. This is in contrast to "heterogeneous" session pools, in which authentication information must be provided by each user since the sessions can have different security attributes and privileges.

Even within a single session pool, there may be multiple sets of sub-session pools that contain heterogeneous or related sessions. For example, as explained in more detail below, sessions may be altered to contain different affinities or unique customizations that differentiate the characteristics of a particular session from other session within its associated session pool. For example, a first session in a session pool may be modified to have a language affinity and a second session within the same session pool may be modified to possess a customized level of resource usage. Groups of such sessions form sub-session pools within a session pool.

As users create and access the sessions in a session pool, the number of sessions in the different session and sub-session pools may fluctuate. If a user seeks a session, but there are no free sessions available in the session pool associated with the user, then a new session could be created for that session pool. Each session that exists in a session pool consumes a given quantity of system resources, such as memory resources. For this reason, there is typically a upper limit as to the number of sessions that may exist in the computing system. When the upper limit of sessions has been reached, some systems allow the user to "force" additional sessions to be created. However, if the number of sessions consumes more system resources than are practical or reasonable for the configuration of the system, this could result in unacceptable performance or errors in the system. For this reason, if the maximum specified number of sessions already exists in the session pools, but all the sessions are already occupied with other work, then the user may be forced to wait until a session becomes free before being able to acquire a session to perform the desired work.

Figure 4:
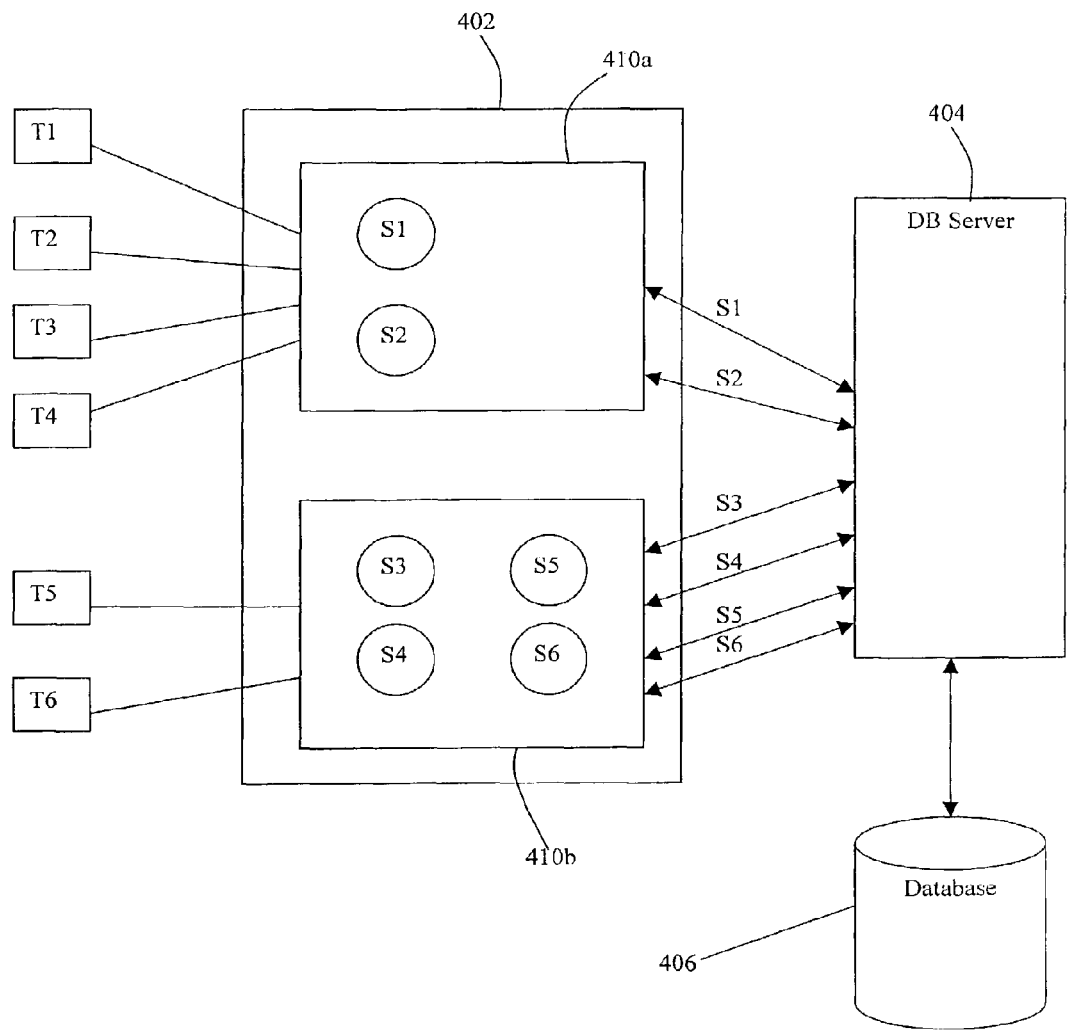
FIG. 4 illustrates an example scenario of unbalanced session allocation between two session pools.

Because of changing workload conditions, inefficient imbalances may come into existence for the number of sessions between the different session pools or sub-session pools. FIG. 4 provides an exemplary scenario of an inefficient imbalance between session pools. Shown in this example is a middle tier server 402 having two homogenous session pools 410a and 410b. Each of these session pools 410a and 410b are configured to interact with database server 404 to access data at database 406. Session pool 410a includes two available sessions S1 and S2. Session pool 410b includes four available sessions S3, S4, S5, and S6. At the client application tier, client applications T1, T2, T3, T4, T5, and T6 are engaged in activity that require them to send work requests to middle tier server 402.

Assume that the maximum number of session for the system has been reached, and no available resource exist to allow the creation of new sessions.

Client applications T5 and T6 are associated with session pool 410b. Consider if each of these client applications T5 and T6 requests an available session from session pool 410b. In the present example, there are enough available sessions (i.e., four available sessions—S3, S4, S5, and S6) in the session pool 410b to satisfy the demand from client applications T5 and T6. If two of the available sessions are assigned to these client sessions, this still leaves two additional sessions that are available to be assigned to later users/client applications that may seek sessions in the immediate future.

Client applications T1, T2, T3, and T4 are associated with session pool 410a. Consider if each of these client applications requests an available session from the session pool 410a. Here, there are not enough available sessions to satisfy the demand. Specifically, there are only two available sessions S1 and S2 in the session pool 410a and there are four client applications (T1, T2, T3, and T4) seeking to acquire a session. In the normal course of events, additional sessions would be created in session pool 410a to satisfy the additional demand for sessions. However, in the present example, it has been already been stated that the maximum number of sessions that can be allocated in the system has been reached and no further sessions may be created. Therefore, under the traditional approach to implementing session pools, only two of the client applications will be assigned sessions and the other two client applications will have to wait until additional sessions in session pool 410a become available.

A resource allocation problem exists in this situation since session pool 410b has a greater number of sessions than it actually needs to fulfill the demand from its associated client applications. In contrast, session pool 410a has a lower number of sessions than is needed to fulfill the demand from its associated client applications. Because of this inefficiency in resource allocation, extraneous resources in session pool 410b are idle and generally unproductive, while necessary work is not being accomplished by session pool 410a because of a lack of available resources.

This type of resource allocation problem can similarly exist for sessions between sub-session pools. Thus, for FIG. 4, consider if session pool 410a corresponds to a first sub-session pool and session pool 410b corresponds to a second sub-session pool within the same session pool. A session imbalance would exist if the users T1, T2, T3, and T4 seeking sessions having the affinity associated with sub-session pool 410a cannot perform the desired work since there are insufficient sessions in sub-session pool 410a. This is in contrast to the situation for sub-session pool 410b which has a greater number of sessions of the given affinity type than sought by users T5 and T6. In some sections of this disclosure, the present description may be illustrated with respect to processes directed to dynamic sizing between different session pools, but as would be clear to those skilled in the art, the present processes can be similarly applied to correct allocation problems for sub-session pools within the same session pool.

Figure 5A:
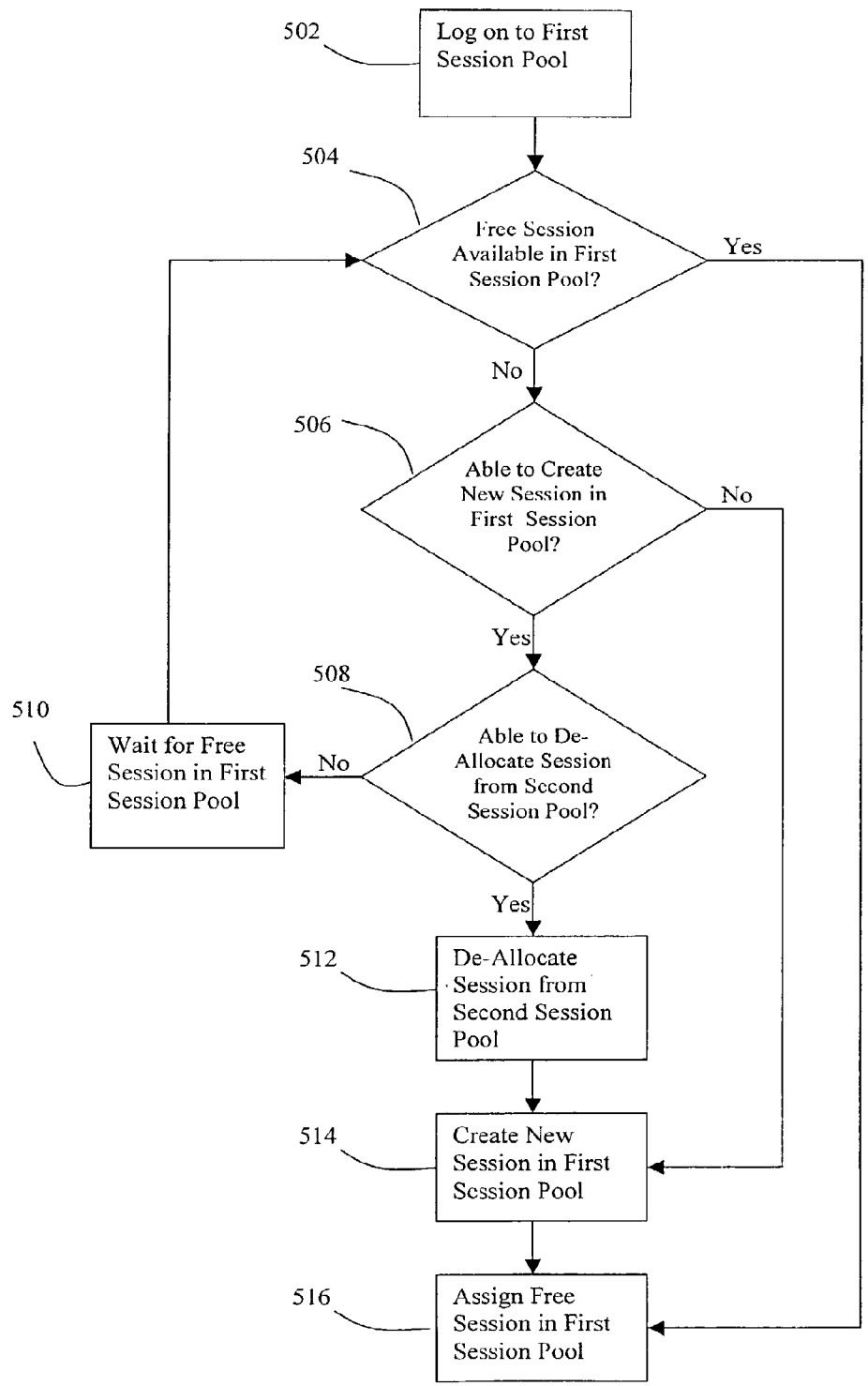
FIGS. 5a and 5b are flowcharts of processes for dynamically resizing session pools according to an embodiment of the invention.

To address these types of resource allocation problems, FIG. 5a shows a flowchart of a process for dynamically sizing session and sub-session pools according to an embodiment of the invention. The process begins when a user/client application logs into a first session pool and seeks to acquire a session (502). A determination is made whether there is an available session in the session pool to be assigned (504). If so, then the available session is assigned to the user/client application (516).

If there is not an available session to be assigned, then a determination is made whether a new session can be created in the respective session pool (506). Some examples of factors that can be considered when making this determination include whether the maximum limit on the number of sessions for the server(s) (and/or session pool) has been reached or whether the amount of free resources in the system/session will allow a new session to be created/forced even if the maximum limit of session has been reached. If a new session can permissively be created, then it is created in the session pool (514) and assigned to the user/client application (516).

If a new session cannot be immediately created, then a determination is made whether there is a session that can or should be de-allocated from another session pool (508). An example of a factor that can be considered when making this determination includes whether there is an idle session in another session pool. If an idle session exists in a second session pool, then the idle session becomes an immediate candidate for de-allocation. If there are no sessions from another session pool that can be identified as a reasonable candidate for de-allocation, then the process causes the user/client application to be placed on wait queue, where it will be blocked or put into sleep/wait mode (510). The user/client application will either be awakened when a session become available, or will periodically awaken to return back to 504 to try again to acquire a free session from the session pool and if a free session is not available, to make another determination whether a session from another session pool can be immediately de-allocated.

If a session from another session pool has been identified as being eligible for de-allocation, then it is de-allocated at 512. De-allocating the session from the second session pool should place the system below the maximum limit of sessions and will free up enough system resources to allow another session to be allocated for the first session pool. Therefore, a new session will be created in the first session pool (514) and will be assigned to the user/client application (516).

Recall the circumstances of FIG. 4, in which session pool 410b has a greater number of sessions than it actually needs to fulfill the demand from its associated client applications, since there are four available sessions (S3, S4, 55, and S6) in the session pool 410b to satisfy the demand from client applications T5 and T6 for two sessions. However, session pool 410a has a lower number of sessions than is needed to fulfill the demand from its associated client applications, since there are only two available sessions S1 and S2 in the session pool 410a and there are four client applications (T1, T2, T3, and T4) seeking to acquire a session.

The process shown in FIG. 5a can be used to dynamically adjust the number of session in each session pool to correct this type of inefficiency. Assume that when client application T5 and T6 seek to acquire sessions, that session S3 and S4 are assigned to these client applications. This leaves sessions S5 and S6 in session pool 410b unassigned. Further assume that sessions S1 and S2 from session pool 410a have been assigned to perform work on behalf of client applications T1 and T2.

At this point, each of the client applications T3 and T4 still need to acquire a session to accomplish their respective work demands. Taking client application T3 first, a determination is made whether there is an available session within session pool 410a to perform work on behalf of client application T3 (504). Since sessions S1 and S2 have already been assigned and are not idle, there means that there is not a free session in the session pool 410a available to be assigned to client application T3.

A determination is made whether a new session can be created in session pool 410a (506). As before, assume that the maximum limit on the number of sessions has been reached and no further sessions may be created in the system.

A further determination is made whether there exists a session from another session pool that is eligible to be de-allocated (508). An example of an eligible session for de-allocation is an idle session from another session pool. Here, session S5 from session pool 410*b* is presently idle. Therefore, session S5 is an eligible candidate for de-allocation and can be immediately de-allocated (512). By de-allocating session S5, this frees up enough system resources to create a new session S7 in session pool 410*a* (514). The new session S7 can now be assigned to client application T3.

Figure 6:
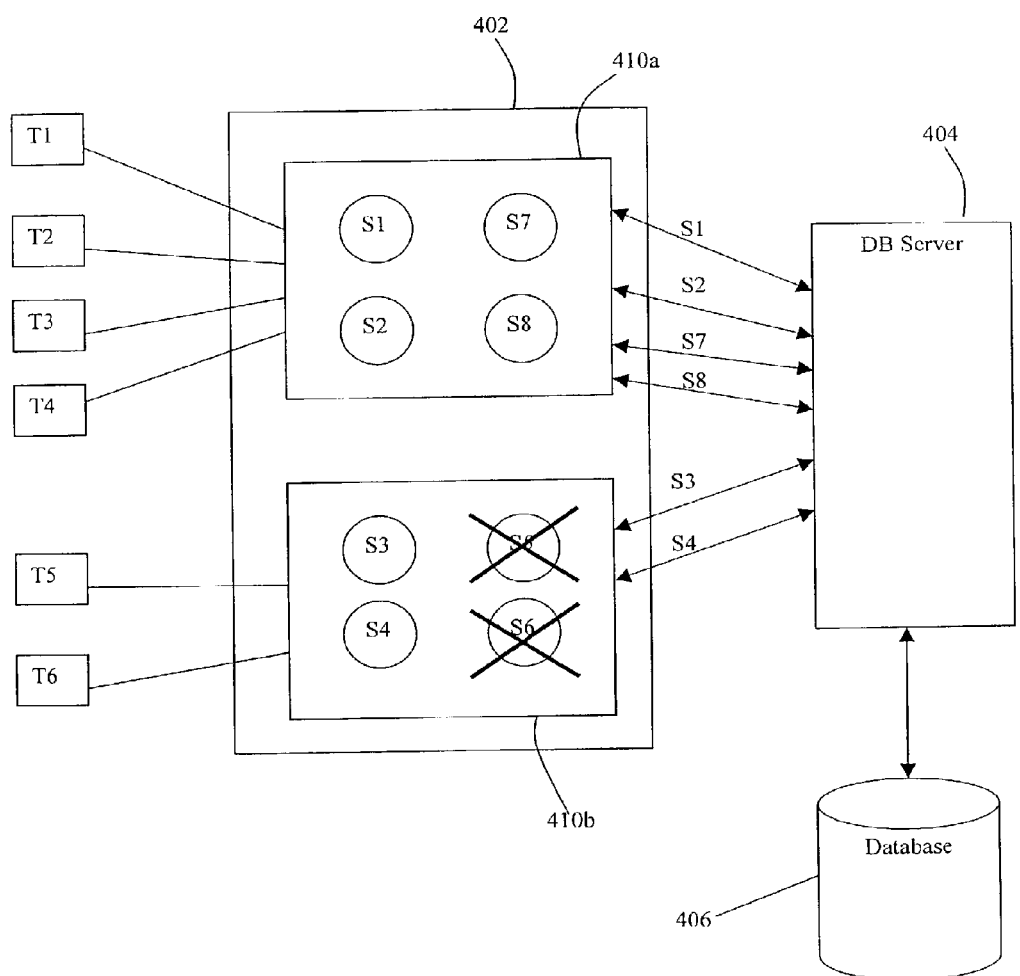
FIG. 6 illustrates the configuration of FIG. 4 after dynamic sizing of the session pools.

In a similar manner, the other idle session S6 in session pool 410*b* can be de-allocated. A new session S8 can be created in session pool 410*a* and assigned to client application T4. The results of this dynamic sizing process is shown in FIG. 6. In an alternate embodiment, rather than explicitly de-allocating a session from a first session pool and allocating a new session in a second session pool, the de-allocation process involves or includes reassigning the session from the first session pool to the second session pool (rather than destroying the session or releasing all resources for the session). In this alternate approach, the configuration metadata for the session can be modified to indicate that the session is assigned to the other session pool.

When dynamically sizing sub-session pools, the session can be modified to create the characteristics or affinities that would inherently place the modified sessions within another sub-session pool. As described in more detail below, tagging can be used to specifically identify the type of customizations associated with sessions in sub-session pools. When assigning a session from one sub-session pool to another sub-session pool, the tag associated with the session, if any, is also changed to explicitly label the changed session as part of the new sub-session pool.

In one embodiment, any number of possible criteria can be used to determine whether one or more sessions from another session pool or sub-session pool are eligible to be de-allocated or reassigned. As noted above, a circumstance in which a session is clearly eligible for de-allocation/reassignment is if a session in a first session pool is presently idle while the lack of available sessions in another session pool or sub-session pool is keeping client applications from being able to accomplish work. However, other criteria may also be used to identify such sessions. Under certain circumstances, even if there are no idle sessions, an existence of extreme imbalance in the number of sessions between the first and second session pools (or sub-session pools) may cause dynamic resizing to shift resources from one session pool to another. This may occur, for example, if the number of sessions in a first session or sub-session pool is dramatically higher than the number of sessions in a second session or sub-session pool, but the number of users in the first session pool is far smaller than the number of users in the second session pool (or are in a wait queue for the second session pool). Even if there are no idles sessions in the first session pool, one or more of the active sessions in the first session pool can be de-allocated to prevent or address inefficiently long wait queues for the second session pool.

Relative priorities between users/client applications and between session or sub-session pools may also be considered when determining whether to dynamically resize session pools. Certain users/client applications may be given higher priority than other user/client applications. The relative order that is established to allocate, de-allocate, or reassign sessions can be skewed based upon the relative ordering between the waiting and active users/client applications. In addition, certain session pools may be given higher prioritization than other session pools. The relative priorities between the session pools can be considered when determining whether to de-allocate a session in a first session pool so that a new session can be created in second session pool. If the first session pool has a higher relative priority than the second session pool, then this may weigh against de-allocating the session from the first session pool. This type or prioritization can also affect the order in which other session pools are searched for eligible session to deallocate. For example, the search for a session to de-allocate will start with a session pool having lower priority than the present session pool, and will proceed through a search of other session pools only if the lower priority session pools do not contain eligible sessions to de-allocate.

In one embodiment, preemptive sizing of session pools may be performed to shift resources between session or sub-session pools, even if not needed to satisfy immediate demand. This type of preemptive sizing of session pools may be performed to accomplish performance goals of the system or to perform balancing of resources across the different session pools. Heuristics may be applied to view changing workload conditions in the system and to forecast shifting demands for sessions in the system.

Figure 5B:
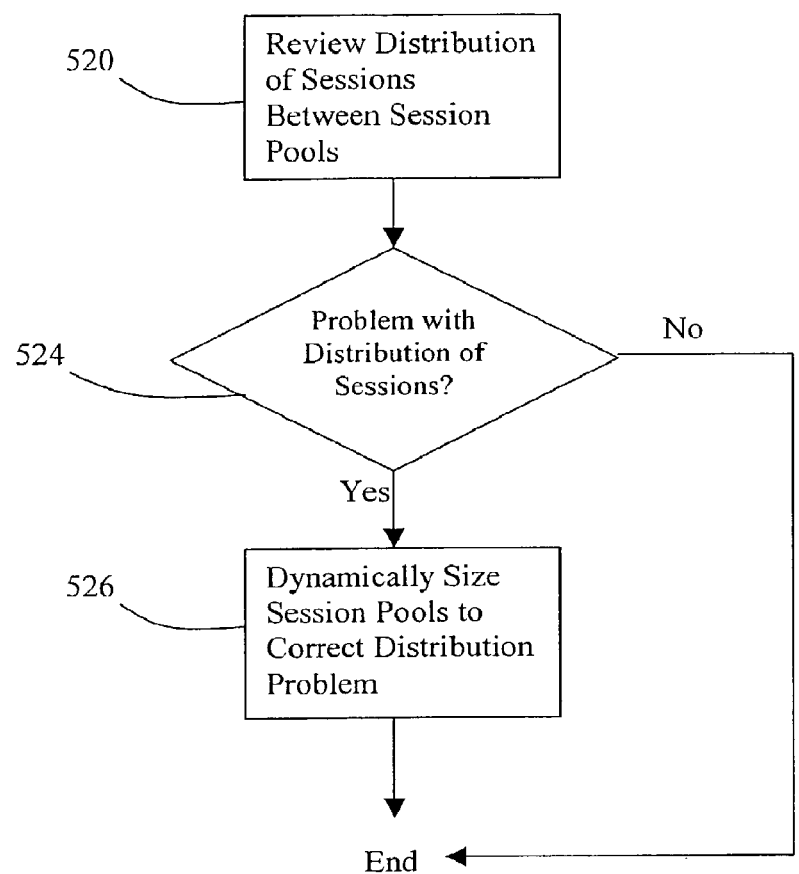

FIG. 5*b* shows a process for preemptively sizing the contents of session or sub-session pools according to an embodiment of the invention. At 520, the distribution of sessions between two or more the session pools are reviewed. A determination is made whether a problem exists with respect to the distribution of sessions between the session pools (524). As previously described for dynamic sizing session pools in response to an immediate session request, any number of possible criteria can be used to determine whether a problem exists with respect to the distribution of sessions between the session pools. For example, an existence of imbalance in the number of sessions between the session pools compared to the actual workload experienced by the respective session pools is an indicator of a problematic imbalance between the session pools. If a problem is identified with the relative distribution of sessions between the session pools, then the affected session pools are dynamically sized to correct the imbalance (526).

Session Tagging

To perform work on behalf of a given user, a session may be modified to have different characteristics and attributes from other sessions. For example, the language characteristics of a computing application are often customized to present information to a user using a specified language. To interface with a client application in a specified language, the session at the middle tier assigned to that client application may be customized with settings that modify the session to create an affinity for that language. There are many such customizations that may be implemented for a session. Other examples of such customizations include setting performance limits and attributes for a session, changing the amount of resources assigned to the session, and setting service times for the session. Additional examples of customizations include setting levels of tracing, open cursors, or diagnostic attributes. One example approach for customizing the attributes of a session in a commercial product is to utilize the ALTER SESSION mechanism for the Oracle 9i system available from Oracle Corporation of Redwood Shored, Calif.

According to one embodiment of the invention, some or all of the sessions in a session pool may be associated with a tag that correlates to the set of properties configured for that session. The tag is a user visible label that is associated with one or more sessions having the set of attributes associated with that tag. There may be several sessions in the session pool with the same tag. The tag on a session can be changed or reset. Groups of like or similar session form sub-session pools within the session pool.

One advantage of tagging sessions is that it allows ready identification of sessions having a set of desired attributes/ characteristics. If users have similar intended purposes or work for a session to perform, and the work requires similarly configured sessions, then it is helpful to re-use a session from the session pool that is already configured with the desired attributes or characteristics. The tag associated with a session facilitates identification of the session with the appropriate attributes.

Figure 7:
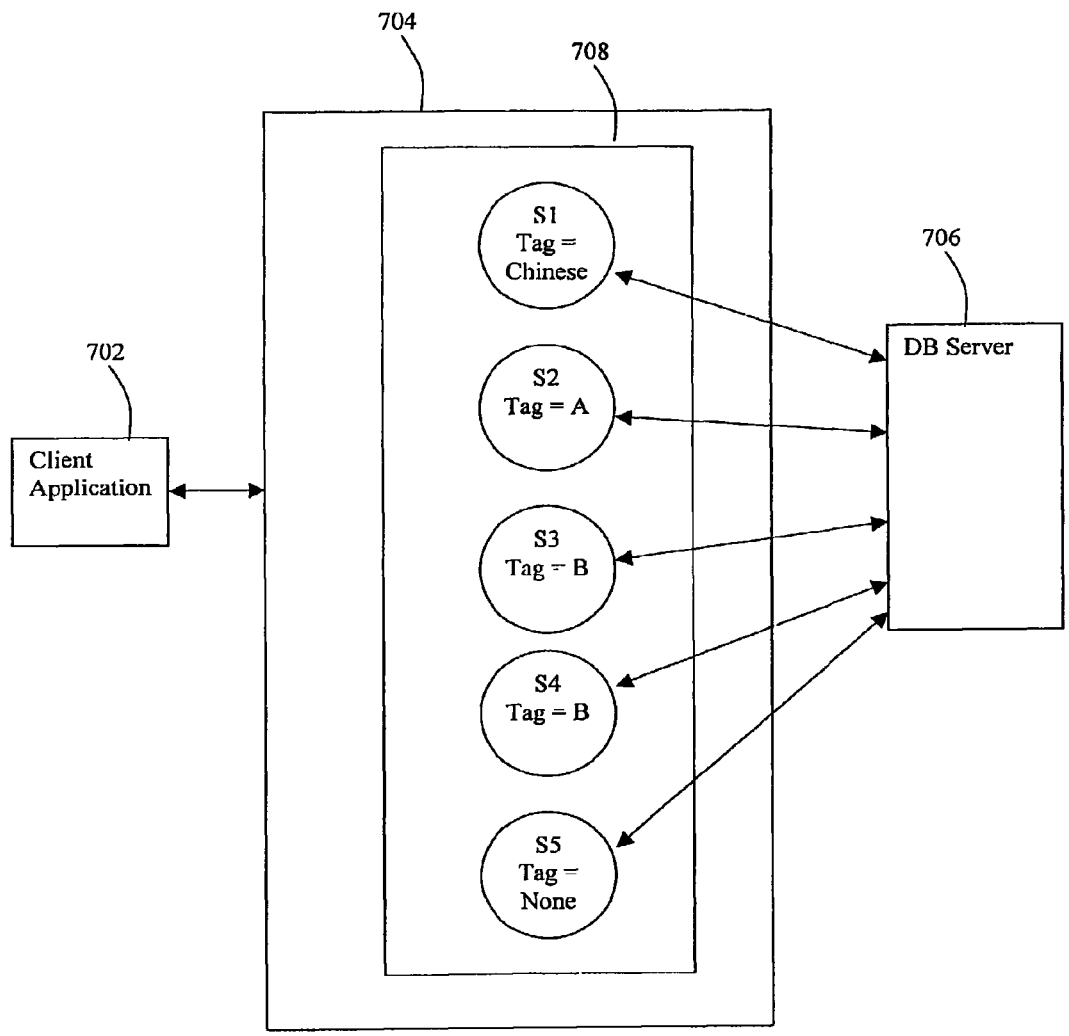
FIG. 7 illustrates tagging of sessions in a session pool according to an embodiment of the invention.

FIG. 7 illustrates an example of a middle tier server 704 having a session pool 708 with tagged sessions. The table 800 in FIG. 8 describes the attributes configured for each of the tagged sessions of FIG. 7. As noted in entry 802 of table 800, the attributes of session S1 in session pool 708 has been configured to include a Chinese language affinity, i.e., the session has been customized to interact with a client application and database in the Chinese language. This session S1 has been associated with the user visible tag "Chinese". For a user that seeks a session having a Chinese language affinity, instead of automatically acquiring a session having default characteristics and performing custom modifications to that standard session to create the desired Chinese language affinity, that user can first search for an available session having the tag associated with the desired characteristics, i.e., the tag "Chinese". If an available session with the appropriate tag is available, then it can be assigned to the user. The session can thereafter immediately perform the intended work without undergoing the expense of further customizations.

In a similar manner, it can be seen from entry 804 of table 800 that session S2, having the tag "A", has been customized with extra memory resources for the session. Any user that needs a session with additional memory resources can search for a session having the tag "A". If session S2 is available, then this session can be assigned to the user, and the session can immediately perform the intended work without requiring the additional expense of customizing the session with additional memory resources.

Multiple sessions may be associated with the same tag if they have the same customized attributes. In the present example, sessions S3 and S4 are both associated with the same tag "B". Each of these sessions S3 and S4 has been configured to include the same set of attributes relating to setting performance limits. If a user desires a session having these characteristics, then the user would request a session having this tag "B". Either of the sessions S3 or S4, if available, could be assigned to the user to satisfy this request. The assigned session could thereafter immediately perform the intended work without requiring the additional expense of customizing the session with desired performance limits.

In addition to the tagged sessions, session pool 704 also includes a un-modified session S5 that have the default characteristics of a newly created session. In the present embodiment, if the user does not request a session having a specific tag, then an untagged session, such as session S5, will be assigned to the user.

Figure 9:
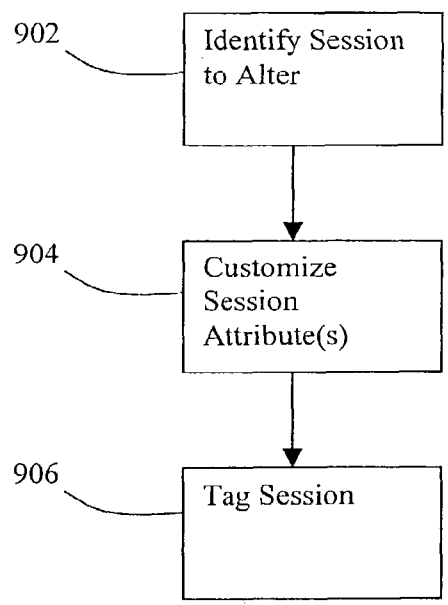
FIG. 9 is a flowchart of a process for tagging sessions according to an embodiment of the invention.

FIG. 9 shows a flowchart of a process for customizing and tagging a session. Initially, the session to be altered/modified is identified (902). The session may be a newly created session having default characteristics. Alternatively, the session may be a session that has already been customized by the same or different user (and may already possess a tag). The identified session is customized with the desired attributes or characteristics (904). As noted above, this type of customization may be performed using the ALTER SESSION mechanism (when used in conjunction with the Oracle 9i product available from Oracle Corporation of Redwood Shores, Calif.). Once the desired attributes have been set for the session, a new tag is associated with the session (906). If the customized attributes for the session match characteristics already set for another tagged session, then the same tag can be used for both sessions having the same attributes. Alternatively, a different tag can be assigned to the modified session, even if its attributes match another session having the same attributes.

When the user is finished with the session, that session can be returned back to the session pool. Unless the session is de-allocated, e.g., because it was the least recently used (LRU) session in the pool or because the session pool has undergone dynamic sizing, the session is available to be re-used at a later point in time. The user that previously modified the session, or even some other user, may later require a session with the same attributes and thus make a request for a session with the same tag.

Figure 10:
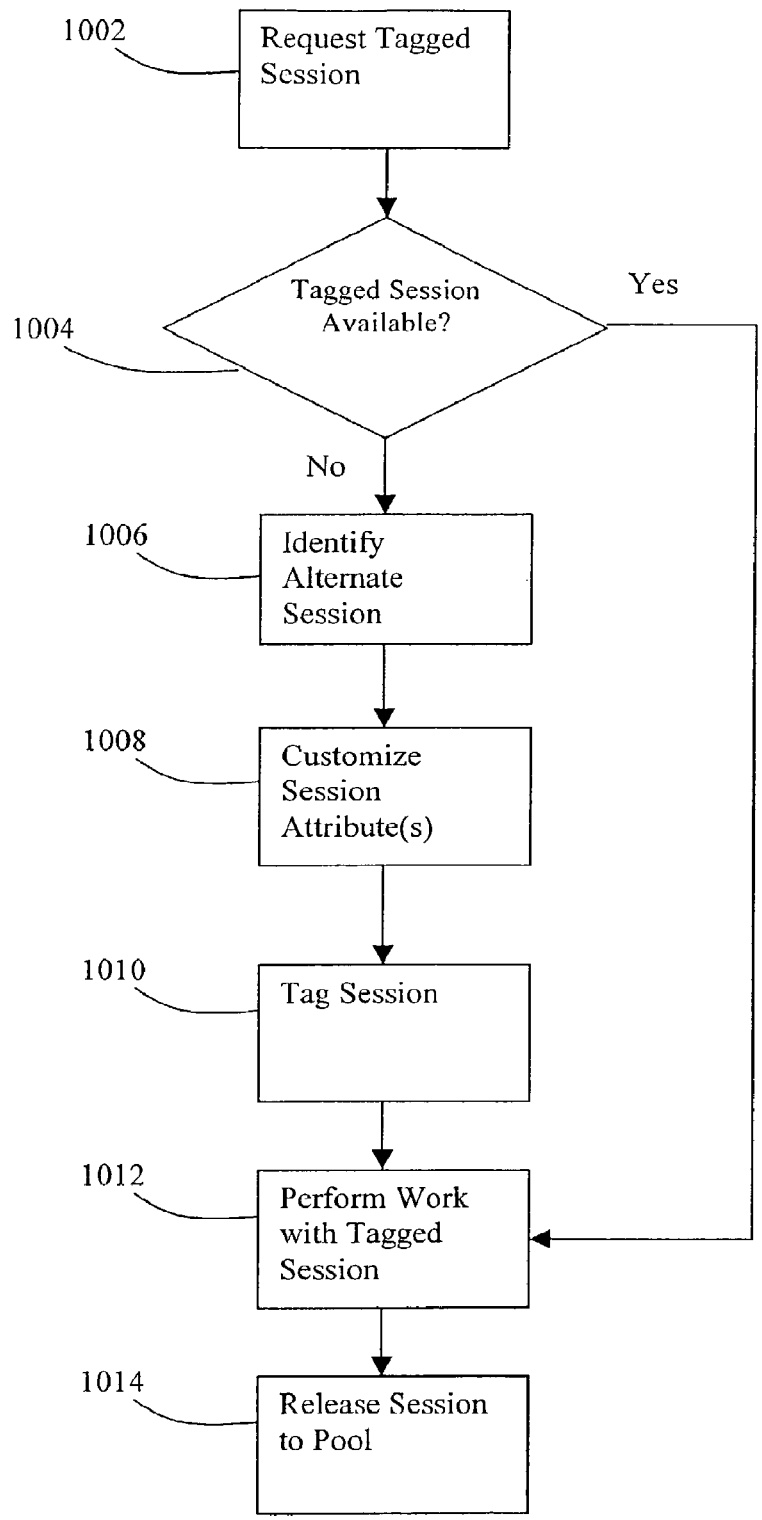
FIG. 10 is a flowchart of a process for requesting a tagged session from a session pool according to an embodiment of the invention.

FIG. 10 shows a flowchart of a process for requesting a tagged session from a session pool according to an embodiment of the invention. The process begins when a user/client application makes a request for a tagged session (1002). A determination is made whether a session having the desired tag is available to be assigned (1004). If so, then the identified session is assigned to the user to performed the intended work (1012).

If a session having the requested tag is not available, then an alternate session will be identified and assigned to the user (1006). Several approaches can be taken to identify an alternate session. In one embodiment, a session having another tag, but with similar attributes to the session with the requested tag is identified. For example, consider a session having the tag "Tag_Chinese Simplified" which is modified to have a language affinity for the Simplified Chinese language format. Further assume that there are no sessions presently available that is associated with this tag, but there is an available session having the tag "Tag_Chinese Traditional" which has been modified to have a language affinity for the Traditional Chinese language format. Since there are no sessions available that have the "Tag_Chinese Simplified" tag, if a user requests such a session, the available session having a similar attributes but with the tag "Tag_Chinese Traditional" may be identified instead. A number of approaches can also be taken to whether attributes between different sessions are "similar". Some example approaches include keyword searches, identifying sessions with similar categories of attribute settings (e.g., common language or resource affinities), or maintaining a list of sessions and/or session attributes that are considered "similar" to one another. Instead of, or in addition to identifying a similar tagged session, a session having default characteristics can be identified at 1006.

In one embodiment, if an alternate tagged session is identified at 1006, then the attributes associated with the alternate session can be identified before proceeding. Instead of just listing the attributed of the alternate tagged session, the differences between the attributes for the tagged session specifically requested by the user and the attributes of the alternate session identified by the system can be presented to the user.

A determination can be made whether the alternate session is usable without further modifications. For example, it is possible that a user that requests a session having an affinity for the Simplified Chinese language format may find acceptable an alternate session having an affinity for the Traditional Chinese language format.

If further modifications are required, then the attribute identification is used to determine what additional modifications are required to create an acceptable session. For example, assume that the user requests a tagged session that has been modified to increase the allocated memory to a level that is triple the standard allocation. However, the only available tagged session with similar attributes has been modified to increase the allocated memory to a level that is only double the standard allocation. By presenting the attributes of the alternate session or the differences between the two sets of attributes, analysis can be performed to determine what additional modifications are needed to prepare an acceptable session (i.e., by further increasing the memory allocation in this example). The attribute identification also allows identification of extra attribute modifications for the alternate tagged session that are detrimental or unneeded for the present user, and can/should be removed or reversed.

At 1008, the identified session is modified to form a set of attributes acceptable to the user. This can be a manual action taken by the user, e.g., using the ALTER SESSION mechanism. Alternatively, this action can be automatically performed by the computing system, e.g., by registering a callback operation to perform the desired modifications. If a list of difference has been prepared between the attributes of the originally requested tagged session and the alternate tagged session, then the automated operation will modify the characteristics of the alternate session to address the identified differences. If an untagged session having default characteristics is identified at 1006, then all of the attributes listed for the originally tagged session will be applied to the untagged session at 1008.

Once the session has been appropriately modified, a new tag will be associated with the session (1010). If the session has been modified to contain the exact same characteristics of an existing tagged session (e.g., the originally requested tagged session), then the modified session can be associated with the same tag as the existing tagged session. If, however, the new session does not exactly match the characteristics of any sessions, then it will be given a new session tag. Even if the session matches the characteristics of an existing tagged session, a new tag can be associated with the modified session.

The newly tagged session can now perform work on behalf of the user (1012). When the tagged session has completed its work, it is released back to the session pool (1014), where it can later be assigned to the same or different user.

Figure 11:
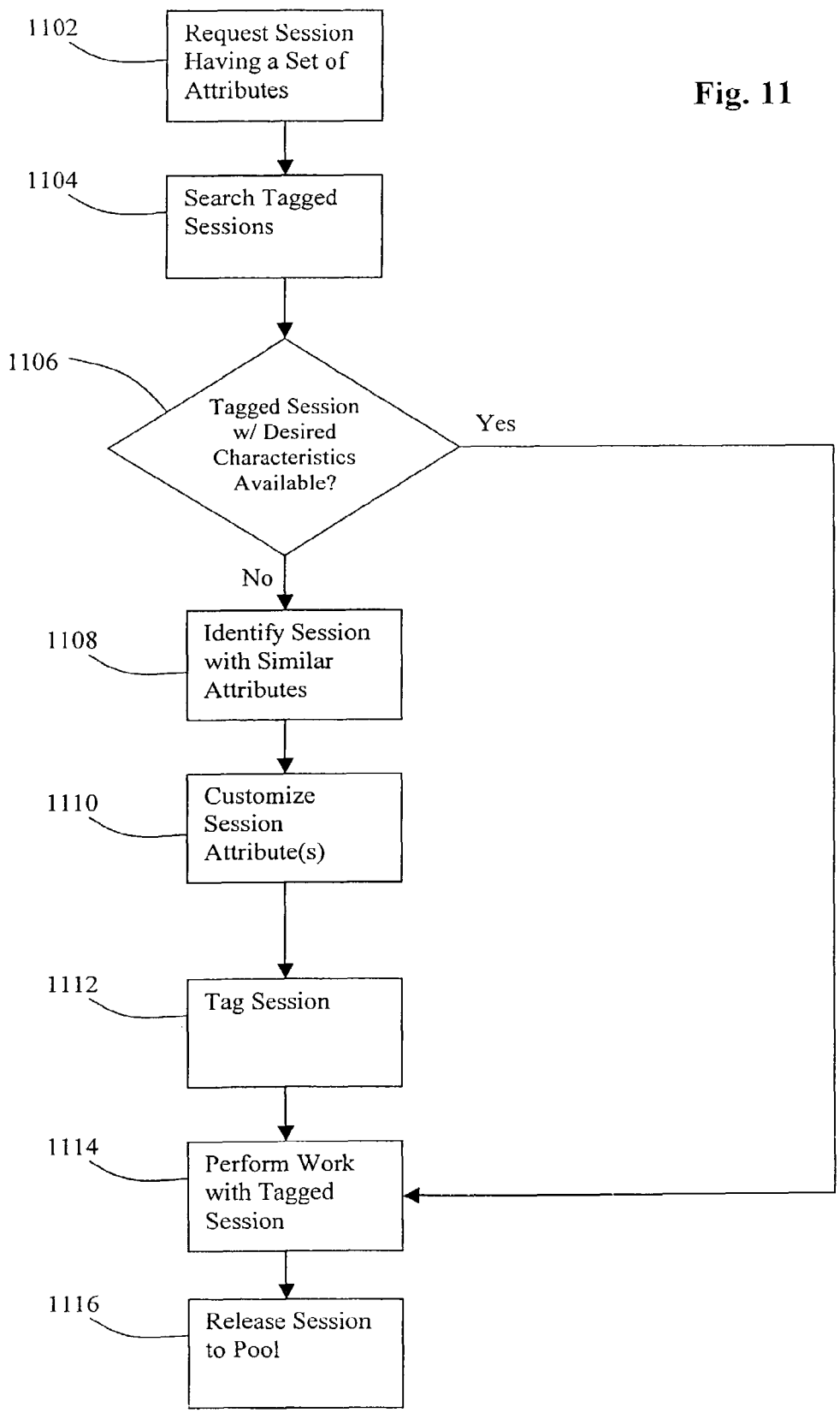
FIG. 11 is a flowchart of a process for searching a session pool for a session having desired characteristics according to an embodiment of the invention.

FIG. 11 shows a flowchart of an alternate process for acquiring a session according to an embodiment of the invention. Here, the process begins when the user requests a session having a set of desired characteristics (1102). The attributes of the already-modified sessions, e.g., the tagged sessions, are searched to identify a matching session (1104). This type of search can be performed, for example, by searching one or more structures that contain information about the tagged sessions (e.g., such as the structure shown in FIG. 8).

A determination is made whether an available session exists that has the desired characteristics (1106). If such a session is available, then it is assigned to the user to perform the intended workload (1114).

If a session having an exact match to the desired characteristics is not available, then identification is made of a session having a set of attributes that is similar to the desired characteristics (1108). A session having default characteristics can also be presented instead of a "similar" session. If an alternate session is identified at 1108, then the attributes associated with the alternate session can be identified before proceeding or the differences between the desired attributes and the attributes of the identified session can be determined and presented to the user.

A determination can be made whether the alternate session is usable without further modifications. As stated before, it is possible that a user that requests a session having an affinity for the Simplified Chinese language format may find acceptable an alternate session having an affinity for the Traditional Chinese language format.

If further modifications are required, then the attribute identification is used to determine what additional modifications are required to create an acceptable session. At 1110, the identified session is modified to form a set of attributes acceptable to the user. This can be a manual action taken by the user, e.g., using the ALTER SESSION mechanism. Alternatively, this action can be automatically performed by the computing system, e.g., by registering a callback operation to perform the desired modifications. If a session having default characteristics is identified at 1108, then all of the desired attributes will be applied to the identified session at 1110.

Once the session has been appropriately modified, a new tag can be associated with the session (1112). The newly modified session can now perform work on behalf of the user (1114). When the session has completed its work, it is released back to the session pool (1116), where it can later be assigned to the same or different user.

It is noted that the process of FIG. 11 can be performed even if tags are not associated with the modified sessions. Instead, only the list of attributes/modifications for the sessions need to be visible to identify a requested session. However, even if tags are not specifically required, they still provide a convenient label to identify and manage the modified sessions.

Dynamic Sizing of Session Pools for Tagged Sessions

Figure 12:
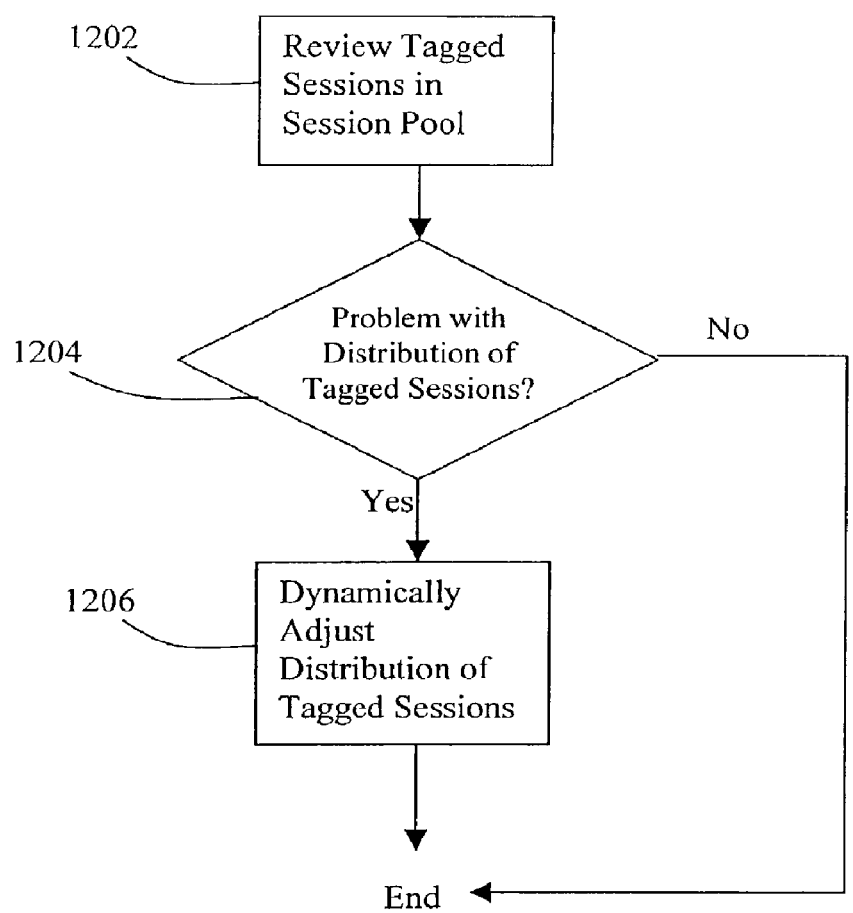
FIG. 12 is a flowchart of a process for dynamically resizing/redistributing session using tags according to an embodiment of the invention.

FIG. 12 is a flowchart of a process for dynamically adjusting or sizing session pools or sub-session pools based upon tagging of sessions according to an embodiment of the invention. At 1202, a review is performed of the tagged sessions in the session or sub-session pool(s) under review. This action comprises, in one embodiment, taking an inventory of the present distribution of tagged session in the session pool.

At 1204, a determination is made whether a problem exists with respect to the distribution of tagged sessions. This action can be used to determine whether an imbalance exists for the specifically tagged sessions in the session/sub-session pool, as compared to the workload demands of the users that access the session pool. For example, if the workload requirements result in more requests for sessions having the tag "A" than sessions having the tag "B", but the session pool actually contains far more sessions having the tag "B" instead of "A", then an imbalance has been identified. This type of imbalance may occur, for example, if a recent spike in the number of requests for session "B" causes the number of sessions having this tag to be created in numbers that exceed historical needs.

The determination of imbalances in the distribution of tags can be made on the basis of the attributes/characteristics of the sessions, rather than the tags. Thus, instead of or in addition to calculating the distribution of sessions based upon the tags associated with the session, the specific attributes possessed by the sessions are viewed when making the analysis. This may cause sessions having different tags but similar or same attributes characteristics to be lumped into the same category when determining the distribution of sessions.

If such a distribution problem is identified, then the relative number of the tagged sessions can be dynamically adjusted to correct the distribution problem (1206). This can be performed by modifying sessions having tags/attributes that exist in too-large quantities into sessions having tags/attributes that have been identified as being too few in quantity. Alternatively, sessions with tags/attributes that exist in too-large quantities can be destroyed to allow creating new sessions having tags/attributes that have been identified as being too few in quantity.

This process can be dynamically performed in response to an immediate request for a tagged session that cannot be fulfilled because of an imbalance in the distribution of the tagged sessions. Alternatively, this session can be performed on a pre-emptive or regularly scheduled basis to correct imbalances in the distribution of tagged sessions even if there is not an immediate request for a tagged session that is not being fulfilled. Heuristic analysis or historical tracking/statistical sampling may be performed to determine whether pre-emptive adjustment of tagged sessions is required.

SYSTEM ARCHITECTURE OVERVIEW

Figure 13:
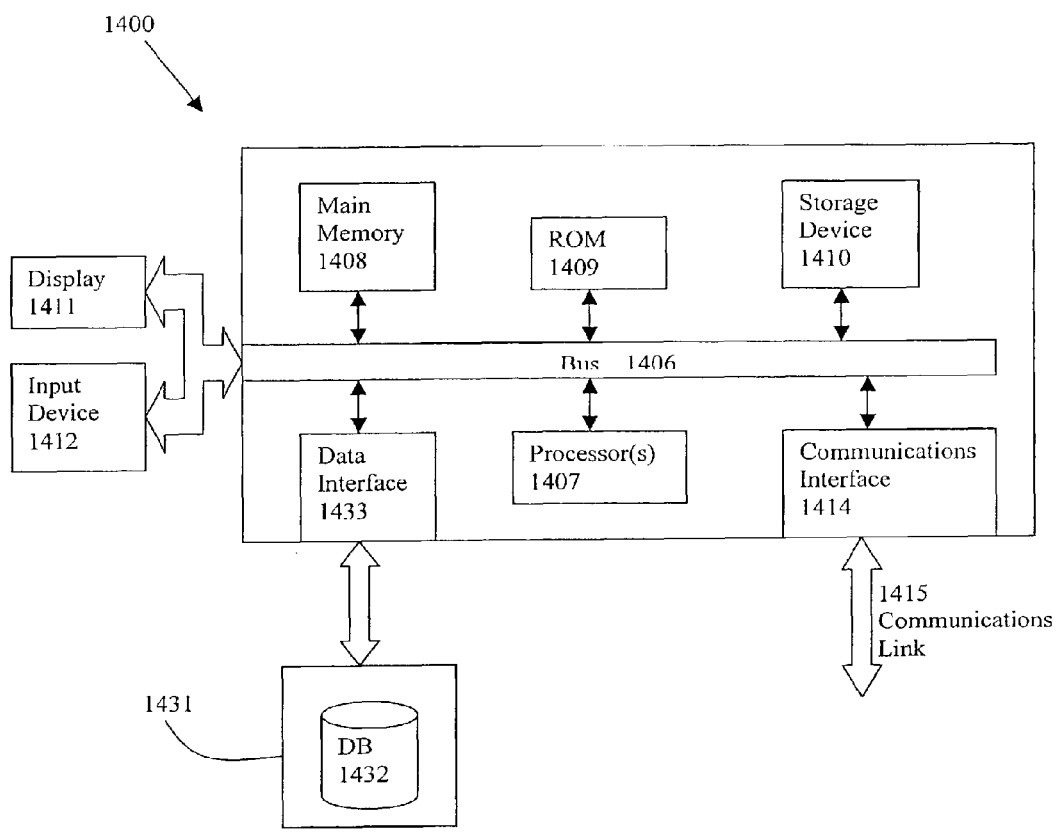
FIG. 13 is a diagram of a computer system with which the present invention can be implemented.

The execution of the sequences of instructions required to practice the invention may be performed in embodiments of the invention by a computer system 1400 as shown in FIG. 13. As used herein, the term computer system 1400 is broadly used to describe any computing device that can store and independently run one or more programs. In an embodiment of the invention, execution of the sequences of instructions required to practice the invention is performed by a single computer system 1400. According to other embodiments of the invention, two or more computer systems 1400 coupled by a communication link 1415 may perform the sequence of instructions required to practice the invention in coordination with one another. In order to avoid needlessly obscuring the invention, a description of only one computer system 1400 will be presented below; however, it should be understood that any number of computer systems 1400 may be employed to practice the invention.

Each computer system 1400 may include a communication interface 1414 coupled to the bus 1406. The communication interface 1414 provides two-way communication between computer systems 1400. The communication interface 1414 of a respective computer system 1400 transmits and receives signals, e.g., electrical, electromagnetic or optical signals, that include data streams representing various types of information, e.g., instructions, messages and data. A communication link 1415 links one computer system 1400 with another computer system 1400. A computer system 1400 may transmit and receive messages, data, and instructions, including program, i.e., application, code, through its respective communication link 1415 and communication interface 1414. Received program code may be executed by the respective processor(s) 1407 as it is received, and/or stored in the storage device 1410, or other associated non-volatile media, for later execution.

In an embodiment, the computer system 1400 operates in conjunction with a data storage system 1431, e.g., a data storage system 1431 that contains a database 1432 that is readily accessible by the computer system 1400. The computer system 1400 communicates with the data storage system 1431 through a data interface 1433. A data interface 1433, which is coupled to the bus 1406, transmits and receives signals, e.g., electrical, electromagnetic or optical signals, that include data streams representing various types of signal information, e.g., instructions, messages and data. In embodiments of the invention, the functions of the data interface 1433 may be performed by the communication interface 1414.

Computer system 1400 includes a bus 1406 or other communication mechanism for communicating instructions, messages and data, collectively, information, and one or more processors 1407 coupled with the bus 1406 for processing information. Computer system 1400 also includes a main memory 1408, such as a random access memory (RAM) or other dynamic storage device, coupled to the bus 1406 for storing dynamic data and instructions to be executed by the processor(s) 1407. The main memory 1408 also may be used for storing temporary data, i.e., variables, or other intermediate information during execution of instructions by the processor(s) 1407. The computer system 1400 may further include a read only memory (ROM) 1409 or other static storage device coupled to the bus 1406 for storing static data and instructions for the processor(s) 1407. A storage device 1410, such as a magnetic disk or optical disk, may also be provided and coupled to the bus 1406 for storing data and instructions for the processor(s) 1407. A computer system 1400 may be coupled via the bus 1406 to a display device 1411, such as, but not limited to, a cathode ray tube (CRT), for displaying information to a user. An input device 1412, e.g., alphanumeric and other keys, is coupled to the bus 1406 for communicating information and command selections to the processor(s) 1407.

According to one embodiment of the invention, an individual computer system 1400 performs specific operations by their respective processor(s) 1407 executing one or more sequences of one or more instructions contained in the main memory 1408. Such instructions may be read into the main memory 1408 from another computer-usable medium, such as the ROM 1409 or the storage device 1410. Execution of the sequences of instructions contained in the main memory 1408 causes the processor(s) 1407 to perform the processes described herein. In alternative embodiments, hard-wired circuitry may be used in place of or in combination with software instructions to implement the invention. Thus, embodiments of the invention are not limited to any specific combination of hardware circuitry and/or software.

The term "computer-usable medium" or "computer-readable medium" as used herein, refers to any medium that provides information or is usable by the processor(s) 1407. Such a medium may take many forms, including, but not limited to, non-volatile and volatile media. Non-volatile media, i.e., media that can retain information in the absence of power, includes the ROM 1409, CD ROM, magnetic tape, and magnetic discs. Volatile media, i.e., media that cannot retain information in the absence of power, include the main memory 1408.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, and the invention can be performed using different or additional process actions, or a different combination or ordering of process actions. The specification and drawings are, accordingly, to be regarded in an illustrative rather than restrictive sense.

What is claimed is:

1. A computer implemented method for configuring a session in a session pool, comprising:
   in a computing system that includes at least one processor to perform a process, the process comprising:
   identifying a session to configure;
   configuring the session such that the session has a first set of attributes;
   determining whether an imbalance in distribution of sessions exists in the session pool by examining at least one attribute of the set of attributes; and
   dynamically associating the session with a first tag based at least in part upon a result of determining whether the imbalance exists in the session pool, the first tag corresponding to the set of attributes.

2. The computer implemented method of claim 1, in which the first tag uniquely identifies the first set of attributes.

3. The computer implemented method of claim 2, in which the first tag is associated with multiple sessions.

4. The computer implemented method of claim 2, in which the first set of attributes corresponds to an affinity for a language format, resource affinity, performance limit, or service time attribute.

5. The computer implemented method of claim 1, further comprising:
    identifying a second session to configure;
    configuring the second session such that the second session has a second set of attributes, the second set of attributes being different from the first set of attributes; and
    associating the second session with a second tag, the second tag corresponding to the second set of attributes.

6. The computer implemented method of claim 1, further comprising:
    identifying a second session to configure;
    configuring the second session such that the second session has a second set of attributes, the second set of attributes being the same as the first set of attributes; and
    associating the second session with the first tag.

7. The computer implemented method of claim 1, the first tag comprising a user-visible label that is associated with the first set of attributes.

8. A computer program product comprising a non-transitory computer usable storage medium having executable code which, when executed by at least one processor, causes the at least one processor to execute a method for configuring a session in a session pool, the method comprising:
    in a computing system that includes the at least one processor to perform a process, the process comprising:
    identifying a session to configure;
    configuring the session such that the session has a first set of attributes;
    determining whether an imbalance in distribution of sessions exists in the session pool by examining at least one attribute of the set of attributes;
    dynamically associating the session with a first tag based at least in part upon a result of determining whether the imbalance exists in the session pool, the first tag corresponding to the set of attributes.

9. A system for configuring a session in a session pool, comprising:
    a computing system including at least one processor that is to:
    identify a session to configure;
    configure the session such that the session has a first set of attributes;
    determine whether an imbalance in distribution of sessions exists in the session pool by examining at least one attribute of the set of attributes; and
    dynamically associate the session with a first tag based at least in part upon a result of determining whether the imbalance exists in the session pool, the first tag corresponding to the set of attributes.

10. The computer program product of claim 8, in which the first tag is associated with multiple sessions.

11. The computer program product of claim 8, the process further comprising:
    identifying a second session to configure;
    configuring the second session such that the second session has a second set of attributes, the second set of attributes being the same as the first set of attributes; and
    associating the second session with the first tag.

12. The system of claim 9, in which the first tag is associated with multiple sessions.

13. The system of claim 9, the computing system that including the at least one processor that is further to:
    identify a second session to configure;
    configure the second session such that the second session has a second set of attributes, the second set of attributes being the same as the first set of attributes; and
    associate the second session with the first tag.

* * * * *

UNITED STATES PATENT AND TRADEMARK OFFICE
CERTIFICATE OF CORRECTION

| | |
|---|---|
| PATENT NO. | : 8,244,888 B2 |
| APPLICATION NO. | : 13/158341 |
| DATED | : August 14, 2012 |
| INVENTOR(S) | : Krishnaswamy et al. |

Page 1 of 1

It is certified that error appears in the above-identified patent and that said Letters Patent is hereby corrected as shown below:

In column 8, line 34, delete "55," and insert -- S5, --, therefor.

In column 12, line 29, delete "Tag_Chinese Simplified" and insert -- Tag_Chinese_Simplified --, therefor.

In column 12, line 33, delete "Tag_Chinese Traditional" and insert -- Tag_Chinese_Traditional --, therefor.

In column 12, line 36, delete "Tag_Chinese Simplified" and insert -- Tag_Chinese_Simplified --, therefor.

In column 12, line 38, delete "Tag_Chinese Traditional" and insert -- Tag_Chinese_Traditional --, therefor.

In column 18, line 3, in Claim 8, after "attributes;" insert -- and --.

Signed and Sealed this
Sixth Day of November, 2012

David J. Kappos
*Director of the United States Patent and Trademark Office*